(12) United States Patent
Holmes et al.

(10) Patent No.: US 8,540,140 B2
(45) Date of Patent: Sep. 24, 2013

(54) AUTOMATED HANDLING OF EXCEPTIONS IN FINANCIAL TRANSACTION RECORDS

(75) Inventors: Frederic Holmes, Lakewood, CA (US); Sheri Bullock, Huntington Beach, CA (US); Brian Akahiji, Torrance, CA (US); Daniel Cordier, Rossmoor, CA (US); Lester A. Wu, Diamond Bar, CA (US)

(73) Assignee: Honda Motor Co., Ltd., Tokyo (JP)

( * ) Notice: Subject to any disclaimer, the term of this patent is extended or adjusted under 35 U.S.C. 154(b) by 1276 days.

(21) Appl. No.: 11/468,594

(22) Filed: Aug. 30, 2006

(65) Prior Publication Data
US 2007/0069006 A1 Mar. 29, 2007

Related U.S. Application Data

(60) Provisional application No. 60/714,179, filed on Sep. 2, 2005.

(51) Int. Cl.
*G06F 17/00* (2006.01)

(52) U.S. Cl.
USPC .............................................. 235/375; 705/30

(58) Field of Classification Search
USPC ......................................... 235/375, 382, 379
See application file for complete search history.

(56) References Cited

U.S. PATENT DOCUMENTS

| | | | |
|---|---|---|---|
| 4,264,808 A | 4/1981 | Owens et al. | |
| 5,488,671 A | 1/1996 | Kern | |
| 5,689,579 A | 11/1997 | Josephson | |
| 5,758,341 A | 5/1998 | Voss | |
| 5,783,808 A | 7/1998 | Josephson | |
| 5,812,989 A | 9/1998 | Witt et al. | |
| 5,870,725 A | 2/1999 | Bellinger et al. | |
| 5,874,717 A | 2/1999 | Kern et al. | |
| 6,055,327 A | 4/2000 | Aragon | |
| 6,058,375 A * | 5/2000 | Park | 705/30 |
| 6,070,798 A | 6/2000 | Nethery | |

(Continued)

FOREIGN PATENT DOCUMENTS

WO  WO 2007104901 A1  9/2007

OTHER PUBLICATIONS

U.S. Appl. No. 11/468,588, filed Aug. 30, 2006: Office Action, dated Feb. 15, 2011.

(Continued)

*Primary Examiner* — Daniel Hess
*Assistant Examiner* — Paultep Savusdiphol
(74) *Attorney, Agent, or Firm* — McDermott Will & Emery LLP (57) ABSTRACT

A financial transactions control system may automate the correction of exceptions in financial transaction data. It may include an exception identification system configured to detect exceptions in the financial transaction data. It may include a storage system configured to store information about the detected exceptions, recipients designated to handle the detected exceptions, and the status of efforts to resolve the exceptions. An exception alert system may be configured to automatically in response to each detected exception look up the identity of at least one recipient that has been designated in the storage system to handle the exception, and to cause a message to be delivered to the at least one identified recipient alerting the at least one identified recipient to the exception. The financial transactions control system may also include an exception tracking system configured to track each exception and the status of efforts to resolve it.

14 Claims, 8 Drawing Sheets

(56) References Cited

U.S. PATENT DOCUMENTS

| | | | |
|---|---|---|---|
| 6,081,790 A | 6/2000 | Rosen | |
| 6,154,729 A * | 11/2000 | Cannon et al. | 705/35 |
| 6,247,000 B1 * | 6/2001 | Hawkins et al. | 705/37 |
| 6,311,166 B1 | 10/2001 | Nado et al. | |
| 6,427,032 B1 | 7/2002 | Irons et al. | |
| 6,625,657 B1 | 9/2003 | Bullard | |
| 6,754,636 B1 | 6/2004 | Walker et al. | |
| 6,904,411 B2 | 6/2005 | Hinkle | |
| 7,062,456 B1 | 6/2006 | Riehl et al. | |
| 7,085,360 B1 | 8/2006 | Sprouse | |
| 7,206,763 B2 | 4/2007 | Turk | |
| 7,236,947 B2 * | 6/2007 | Eckert et al. | 705/26 |
| 7,236,957 B2 | 6/2007 | Crosson Smith | |
| 7,296,192 B2 * | 11/2007 | Breitling et al. | 714/49 |
| 7,356,516 B2 * | 4/2008 | Richey et al. | 705/80 |
| 7,373,669 B2 | 5/2008 | Eisen | |
| 7,383,231 B2 | 6/2008 | Gupta et al. | |
| 7,388,495 B2 * | 6/2008 | Fallin et al. | 340/572.1 |
| 7,437,327 B2 | 10/2008 | Lam et al. | |
| 7,451,100 B2 | 11/2008 | Kishi | |
| 7,490,112 B1 | 2/2009 | Suresh et al. | |
| 7,546,312 B1 | 6/2009 | Xu et al. | |
| 7,599,877 B1 | 10/2009 | Cole et al. | |
| 7,606,721 B1 * | 10/2009 | Donnelly et al. | 705/2 |
| 7,639,141 B2 | 12/2009 | Elledge | |
| 7,676,427 B1 | 3/2010 | Bongiorno et al. | |
| 7,720,751 B2 | 5/2010 | Bongiorno et al. | |
| 2002/0111886 A1 * | 8/2002 | Chenevich et al. | 705/30 |
| 2003/0050879 A1 * | 3/2003 | Rosen et al. | 705/35 |
| 2003/0115172 A1 | 6/2003 | Mangalvedhekar | |
| 2003/0120528 A1 | 6/2003 | Kruk et al. | |
| 2003/0144852 A1 * | 7/2003 | Eckert et al. | 705/1 |
| 2003/0149645 A1 | 8/2003 | Flynn et al. | |
| 2003/0149653 A1 * | 8/2003 | Penney et al. | 705/37 |
| 2003/0233321 A1 | 12/2003 | Scolini et al. | |
| 2004/0019500 A1 | 1/2004 | Ruth | |
| 2004/0034593 A1 | 2/2004 | Toneguzzo et al. | 705/39 |
| 2004/0057454 A1 | 3/2004 | Hennegan et al. | |
| 2004/0143522 A1 | 7/2004 | Wall et al. | |
| 2004/0162781 A1 * | 8/2004 | Searl et al. | 705/51 |
| 2004/0164863 A1 * | 8/2004 | Fallin et al. | 340/572.1 |
| 2004/0181482 A1 | 9/2004 | Yap | |
| 2004/0260582 A1 | 12/2004 | King et al. | |
| 2005/0065839 A1 * | 3/2005 | Benson et al. | 705/10 |
| 2005/0065865 A1 | 3/2005 | Salomon et al. | |
| 2005/0065987 A1 | 3/2005 | Telkowski et al. | |
| 2005/0097150 A1 | 5/2005 | McKeon et al. | |
| 2005/0102226 A1 * | 5/2005 | Oppenheimer et al. | 705/38 |
| 2005/0119926 A1 | 6/2005 | Turetsky et al. | |
| 2005/0160031 A1 * | 7/2005 | Hendrickson | 705/37 |
| 2005/0197910 A1 * | 9/2005 | Wittmer et al. | 705/26 |
| 2005/0209876 A1 * | 9/2005 | Kennis et al. | 705/1 |
| 2005/0228685 A1 | 10/2005 | Schuster et al. | |
| 2005/0240531 A1 | 10/2005 | Wolff, Jr. | |
| 2005/0278580 A1 * | 12/2005 | Breitling et al. | 714/39 |
| 2005/0283463 A1 * | 12/2005 | Dill et al. | 707/2 |
| 2006/0047561 A1 | 3/2006 | Bolton | |
| 2006/0053168 A1 | 3/2006 | McDougal et al. | |
| 2006/0059026 A1 | 3/2006 | King et al. | |
| 2006/0080255 A1 | 4/2006 | Riehl et al. | |
| 2006/0095372 A1 * | 5/2006 | Venkatasubramanian et al. | 705/40 |
| 2006/0095373 A1 | 5/2006 | Venkatasubramanian et al. | |
| 2006/0122906 A1 | 6/2006 | Emi | |
| 2006/0129441 A1 | 6/2006 | Yankovich et al. | |
| 2006/0143231 A1 | 6/2006 | Boccasam et al. | |
| 2006/0200508 A1 | 9/2006 | Telkowski et al. | |
| 2006/0212373 A1 | 9/2006 | Maxwell et al. | |
| 2006/0212487 A1 | 9/2006 | Kennis et al. | |
| 2006/0241991 A1 | 10/2006 | Pudhukottai et al. | |
| 2006/0248009 A1 | 11/2006 | Hicks et al. | |
| 2006/0259316 A1 | 11/2006 | Breslin et al. | |
| 2006/0292973 A1 | 12/2006 | Brooks | |
| 2007/0005498 A1 | 1/2007 | Cataline et al. | |
| 2007/0055596 A1 | 3/2007 | Yankovich et al. | |
| 2007/0094199 A1 | 4/2007 | Deshpande et al. | |
| 2007/0100716 A1 | 5/2007 | Holmes et al. | |
| 2007/0100717 A1 | 5/2007 | Holmes et al. | |
| 2007/0156546 A1 | 7/2007 | Oppert et al. | |
| 2007/0192218 A1 | 8/2007 | Licardi et al. | |
| 2007/0233508 A1 | 10/2007 | Gillespie | |
| 2008/0082377 A1 | 4/2008 | Kennis et al. | |
| 2008/0195579 A1 | 8/2008 | Kennis et al. | |
| 2009/0292630 A1 | 11/2009 | Hahn-Carlson et al. | |

OTHER PUBLICATIONS

U.S. Appl. No. 11/468,471, filed Aug. 30, 2006: Office Action, dated Aug. 18, 2010.
U.S. Appl. No. 11/468,588, filed Aug. 30, 2006: Office Action, dated Apr. 14, 2010.
U.S. Appl. No. 11/468,471, filed Aug. 30, 2006: Office Action, dated Jan. 25, 2010.
U.S. Appl. No. 11/468,588, filed Aug. 30, 2006: Office Action, dated Jun. 17, 2009.
U.S. Appl. No. 11/468,588, filed Aug. 30, 2006: Office Action, dated Dec. 24, 2008.
U.S. Appl. No. 11/468,471, filed Aug. 30, 2006: Notice of Allowance, dated Aug. 25, 2011.
U.S. Appl. No. 11/468,588, filed Aug. 30, 2006: Notice of Allowance, dated Sep. 2, 2011.

* cited by examiner

FIG. 3

| CONTROL DATA | |
|---|---|
| Control ID | SI003 |
| Control Type | Sending |
| Transaction Type | Sale |
| Processing Date | 8/18/06 |
| Job ID | PFA71J01 |
| Record Count | 1,200 |
| Dollar Amount | $1,200,000.00 |

AUTOMATED HANDLING OF EXCEPTIONS IN FINANCIAL TRANSACTION RECORDS

CROSS-REFERENCE TO RELATED APPLICATION

This application claims the benefit of and priority to U.S. provisional application Ser. No. 60/714,179, filed Sep. 2, 2005, entitled "SOX Control Balancing System,". This application is also related to U.S. patent application Ser. No. 11/468,471 (now U.S. Pat. No. 8,099,340, issued Jan. 17, 2012), entitled "Financial Transaction Controls Using Sending And Receiving Control Data," and U.S. patent application Ser. No. 11/468,588 (now U.S. Pat. No. 8,095,437, issued Jan. 10, 2012), entitled "Detecting Missing Records in Financial Transactions By Applying Business Rules," both filed on the same day as this application. The entire content of all three of these applications is incorporated herein by reference.

BACKGROUND

1. Field

This application relates to controls on financial information, including controls required by the Sarbanes-Oxley Act of 2002 (SOX).

2. Description of Related Art

Errors sometimes occur when sending, delivering, receiving, recording, processing, supplementing, and/or modifying financial transaction data. These errors may be the result of malfunctioning equipment, data entry errors, data classification errors, modification errors, other types of errors, and/or dishonesty. Detecting these errors can be difficult, time consuming and costly.

The Sarbanes-Oxley Act of 2002 (SOX) was enacted to reduce dishonest and unreliable reports of financial information by publicly traded companies. It requires their executive officers to personally vouch for the accuracy of financial reports and for the accuracy of these reports to be protected by sound internal controls. Meeting the requirements of the Sarbanes-Oxley Act of 2002 can also be difficult, time-consuming and costly.

SUMMARY

A financial transactions control system may automate the correction of exceptions in financial transaction data. It may include an exception identification system configured to detect exceptions in the financial transaction data. It may also include a storage system configured to store information about the detected exceptions, recipients designated to handle the detected exceptions, and the status of efforts to resolve the exceptions. It may also include an exception alert system. The exception alert system may be configured to automatically in response to each detected exception look up the identity of at least one recipient that has been designated in the storage system to handle the exception, and to cause a message to be delivered to the at least one identified recipient alerting the at least one identified recipient to the exception. The financial transactions control system may also include an exception tracking system configured to track each exception and the status of efforts to resolve it.

The exception identification system may be configured to identify the nature of each exception, such as a business department to which it relates. The storage system may be configured to store information about the nature of exceptions that each recipient has been designated to handle. The exception alert system may be configured to look up the identify of at least one recipient that is indicated in the storage system as having been designated to handle an exception of the nature identified.

The financial transactions control system may include a reporting system configured to generate reports about the exceptions and the status of efforts to resolve them. The reporting system may be configured to sort at least one of the reports based on the age of the exception.

The exception alert system may be configured to deliver each message by email, and the storage system may be configured to store the email address of each recipient.

The exception tracking system may be configured to receive emails from recipients to whom an alert was sent that include information about the status of efforts to resolve the exception for which a message was sent to the recipient by the exception alert system.

These, as well as other components, steps, features, objects, benefits, and advantages, will now become clear from a review of the following detailed description of illustrative embodiments, the accompanying drawings, and the claims.

DETAILED DESCRIPTION OF ILLUSTRATIVE EMBODIMENTS

Figure 1:
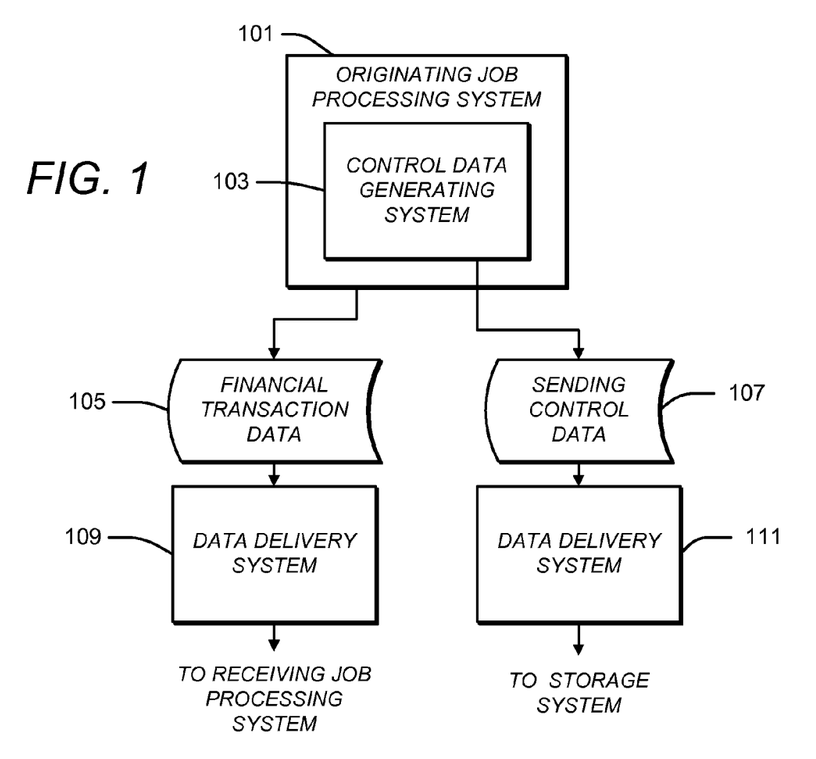
FIG. 1 illustrates sending control data that may be generated by an originating job processing system.

FIG. 1 illustrates sending control data 107 that may be generated by an originating job processing system 101. The originating job processing system 101 may be configured to generate financial transaction data 105 based on information from one or more databases, provided by a user, from another system and/or from any other source. The originating job processing system 101 may be of any type and may be reflective of any source that originates or manages financial transaction data.

Figure 2:
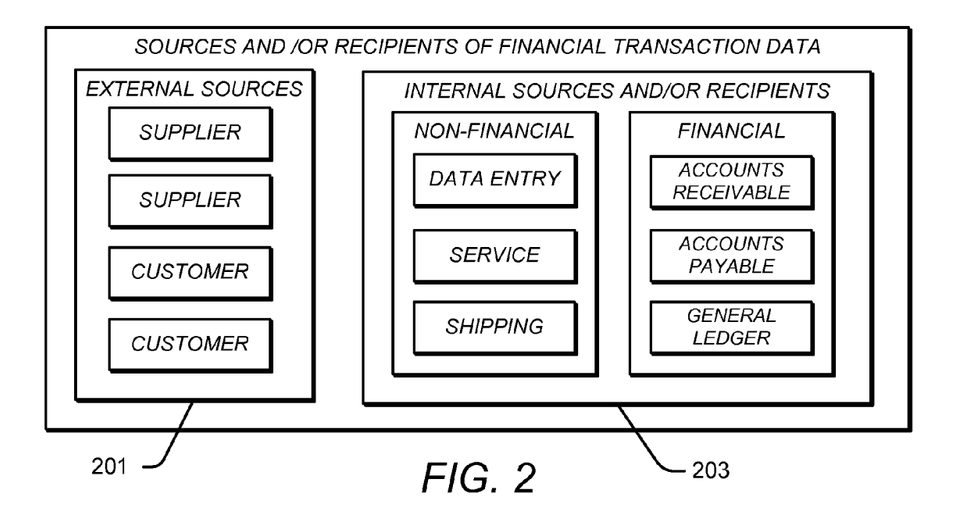
FIG. 2 illustrates examples of sources and/or recipients of financial transaction data.

FIG. 2 illustrates examples of sources and/or recipients of financial transaction data. As illustrated in FIG. 2, a particular company or organization may have one or more external sources 201 and/or one or more internal sources 203 of financial transaction data. The external sources 201 may include one or more suppliers and/or customers. The internal sources 203 may include one or more departments that are not directly involved in the finances of the company, such as a data entry department, service department and/or a shipping department. The internal sources 203 may include in addition or instead one or more departments that are directly involved in the finances, such as an accounts receivable, accounts payable and/or a general ledger department. The origination job processing system 101 may be reflective of any other department or type of source.

The originating job processing system 101 may be implemented by any combination of computer hardware and/or software. The hardware may include one or more personal or other types of computers, either at a single location or distributed across multiple locations. The software may include one or more operating systems and application programs. The software may be configured to operate on a stand-alone basis, in a client-server configuration, or in any other configuration. Appropriate user-interface devices may be utilized to facilitate communication between one or more users and the originating job processing system 101, including one or more keyboards, mice, touch screens, microphones, displays, printers, and/or sound systems.

The financial transaction data 105 may include a collection of financial transaction data that is intended to be processed by a receiving job. The receiving job may be the ultimate destination for the financial transaction data or it may be an intermediate destination that processes the financial transaction data further and passes it onto another intermediate job or to the ultimate destination.

The financial transaction data 105 may be of any type and may concern any financial matter, such as a financial matter relating to one or more companies and/or organizations. It may, for example, be information representative of an invoice, cash draft, wire transfer payment, reimbursement, bill, purchase order, shipping record, and/or any other type of financial transaction. The financial transaction data 105 may be in any format. It may consist of or include one or more flat, relational, hierarchical or other type of files. The financial transaction data may be extracted from one or more databases.

The financial transaction data 105 may be delivered to one or more receiving job processing systems by a data delivery system 109. The data delivery system 109 may be implemented by hardware, software or a combination of these. It may be configured to deliver the financial transaction data 105 in a format that is readily understood by the receiving job processing system or systems. The data delivery system 109 may also be configured to deliver a copy of the financial transaction data 105 to a central storage system (not shown), which may be configured to receive and store the financial transaction data 105, along with financial transaction data from other job processing systems. The data delivery system 109 may be configured to deliver the financial transaction data 105 over any communication system, such as the Internet, a telephone line, a WAN, a LAN, or any combination of these. The connection may be wired or wireless or a combination of these.

The originating job processing system 101 may include a control data generating system 103. The control data generating system 103 may be configured to generate sending control data 107. The sending control data 107 may include information that may aid in the process of imposing controls on the financial transaction data 105. The sending control data 107, for example, may include one or more totals of the financial transaction data 105. In one embodiment, for example, the financial transaction data 105 may include a plurality of records, and the sending control data 107 may include a total of the number of those records. In another embodiment, the financial transaction data 105 may include the dollar amount for each of a number of transactions, and the sending control data 107 may include the total of these dollar amounts. In a still further embodiment, the financial transaction data 105 may include both a plurality of records and the dollar amount for each of the number of transactions, and the sending control data 107 may include both a total of the number of these records and a total of these dollar amounts. The sending control data 107 may also include information identifying the originating job processing system 101.

The control data generating system 103 may be configured to extract the control information, such as the total number of records and the total of the dollar amounts, from the financial transaction data 105 that is generated by the originating job processing system 101. The control data generating system 103 may also be configured to add the identification information to the sending control data 107, such as information identifying the originating job processing system 101.

Figure 3:
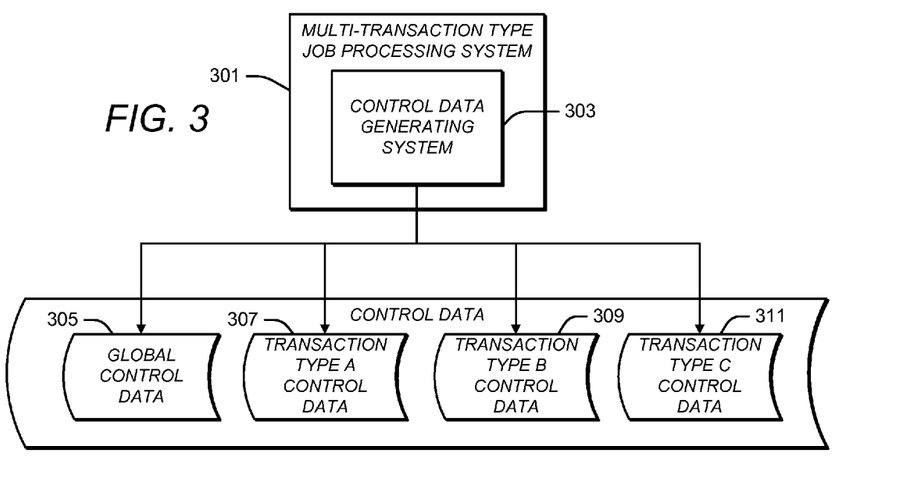
FIG. 3 illustrates both global and transaction level control data that may be generated based on a multi-transaction type job processing system.

FIG. 3 illustrates a multi-transaction type job processing system 301 and associated global and transaction level control data that may be generated as a result. The multi-transaction type job processing system 301 may be configured to generate financial transaction data (not shown) that includes information about multiple types of financial transactions. It may include a control data generating system 303 that is configured to generate both global and transaction level control data from the financial transaction data, such as global control data 305, transaction type A control data 307, transaction type B control data 309, and transaction type C control data 311. The global control data 305 may include one or more totals relating to all of the financial transaction data, while the transaction type A, B and C control data 307, 309 and 311, respectively, may each include one or more totals relating to only one particular type of transaction within the financial transaction data.

The originating job processing system 101 may be capable of generating financial transaction data that includes information about multiple types of financial transactions, like the multi-transaction type job processing system 301. In such a case, the sending control data 107 may include totals relating to all of the financial transactions in the financial transaction data 105 and/or totals relating to the financial transactions for each of the transaction types. Each of these totals may include the total number of records and/or a total of the dollar amounts.

The sending control data 107 may be in any format. For example, the sending control data 107 may consists of one or more records, each in a particular format.

Figure 4:
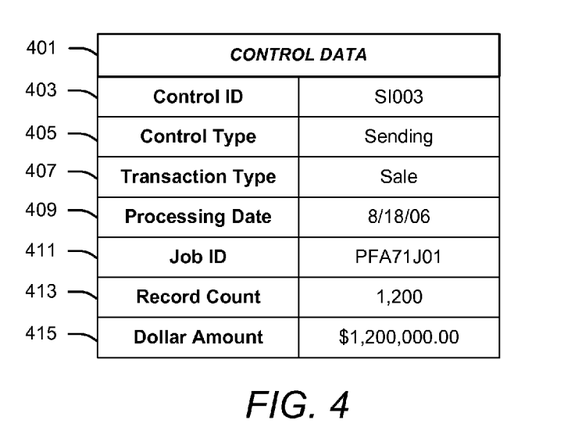
FIG. 4 illustrates fields of information that may be in control data, such as the sending control data illustrated in FIG. 1.
Figure 5:
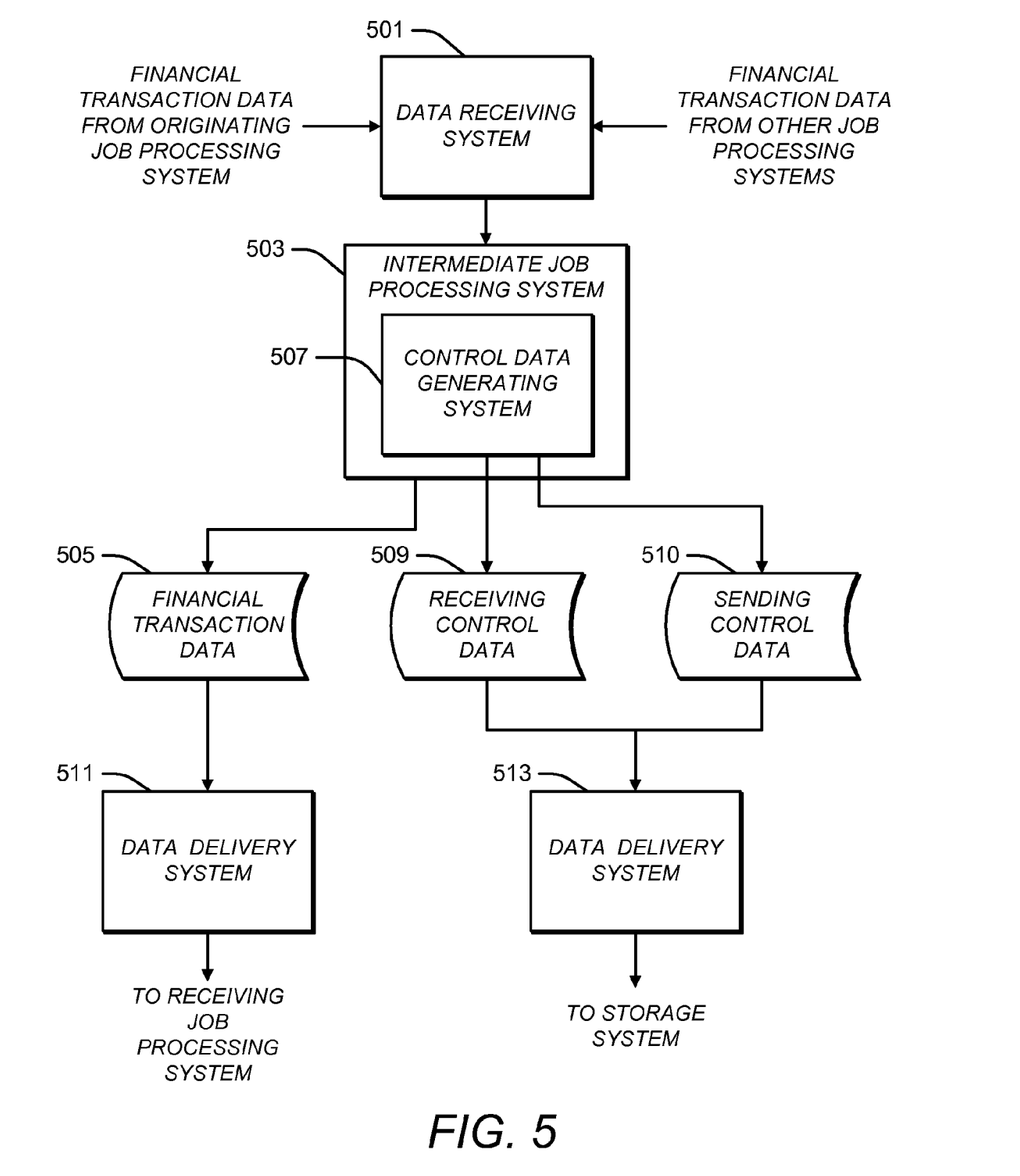
FIG. 5 illustrates receiving and sending control data that may be generated by an intermediate job processing system.

FIG. 4 illustrates fields of information that may be within control data, such as the sending control data 107. As shown in FIG. 6, control data 401 may include various fields of information. For example, the control data 401 may include identifying information, such as a control ID 403 that identifies the control data 401 and a control type 405 that identifies whether the control data 401 is sending control data, such as the control data 107 shown in FIG. 3, or receiving control data, such as receiving control data 509 that is shown in FIG. 5 and discussed below.

The identifying information may also include a transaction type 407 indicating the type of transaction to which the control data 401 is directed. This field may be useful in connection with financial transaction data that is generated by a multi-transaction type job processing system, such as the multi-transaction type job processing system 301 shown in FIG. 3. It may indicate the type of transaction to which the at least one total in the control data 401 is directed. In the event that the control data 401 is global control data directed to all of the financial transaction data, the transaction type may be specified as "all" or with information having a similar meaning. In the event that the control data 401 is directed to financial transaction data of only a specific type, such as the transaction type A control data 307, the type of that financial transaction data may be specified.

The identifying information may also include a processing date 409 indicating the date on which the control data 401 was created and a job ID 411 identifying the particular job that created the control data 401.

The control data 401 may also include one or more totals, such as a record count 413 indicating the number of records in the financial transaction data that is represented by the control data and/or a dollar amount 415 indicating the dollar amount of those transactions. As explained above, these may represent totals of all of the financial transaction data or of only a particular type of financial transaction data.

The control data 401 may have additional or different fields of information.

Referring back to FIG. 1, the sending control data 107 may be delivered to be a storage system for later processing by a data delivery system 111. The data delivery system 111 may be implemented by hardware, software or a combination of these. It may deliver the sending control data 107 in a format that is readily understood by the storage system. The data delivery system 111 may be configured to deliver the sending control data 107 over any communication system, such as the Internet, a telephone line, a WAN, a LAN, or any combination of these. The connection may be wired or wireless or a combination of these.

FIG. 5 illustrates receiving control data 509 and sending control data 510 that may be generated by an intermediate job processing system 503. As shown in FIG. 5, a data receiving system 501 may be configured to receive the financial transaction data from the originating job processing system 101. It may also be configured to receive financial transaction data from one or more other job processing systems. The data receiving system 501 may be configured to combine all of the financial transaction data that it receives for the intermediate job processing system 503 and to deliver this in this combined form to the intermediate job processing system 503.

The data receiving system 501 may be implemented by hardware, software or a combination of these. It may deliver the combined financial transaction data that it receives in a format that is readily understood by the intermediate job processing systems 503. The data delivery system 501 may be configured to receive financial transaction data over any communication system, such as the Internet, a telephone line, a WAN, a LAN, or any combination of these. The connection may be wired or wireless or a combination of these.

The intermediate job processing system 503 may be configured to generate financial transaction data 505 based on the financial transaction data it receives from the data receiving system 501, as well as based on information that may be provided by a user, another system, and/or from any other source.

The intermediate job processing system 503 may be of any type and may be reflective of any recipient that processes financial transaction data and that generates related financial transaction data as a result, such as one of the internal sources and/or recipients 203 identified in FIG. 4. The intermediate job processing system 503 may be reflective of any other department or type of recipient.

The intermediate job processing system 503 may include a control data generating system 507 that is configured to generate receiving control data 509 and sending control data 510.

The sending control data 510 may be in the same format and contain similar types of information as the sending control data 107 shown in FIG. 1 and discussed above. As with the sending control data 107 shown in FIG. 1, the sending control data 510 may include one or more totals representative of the financial transaction data 505. As with the sending control data 107 shown in FIG. 1, these totals may be indicative of all of the financial transaction data 505 and/or of each of the different types of a financial transaction data contained therein.

The receiving control data 509 may be in the same format and contain similar types of information as the sending control data 510. Unlike the sending control data 510, however, the totals in the receiving control data 509 may be representative of the financial transaction data that is delivered to the intermediate job processing system 503 by the data receiving system 501. Thus, the sending control data 510 may be representative of the financial transaction data that is generated by the intermediate job processing system 503, while the receiving control data 509 may be representative of the financial transaction data that is delivered to the intermediate job processing system 503.

In those situations in which the data receiving system 501 receives financial transaction data from a plurality of job processing systems, the totals in the receiving control data 509 may be representative of the totals for all of the financial transaction data that is received by the data receiving system 501. This may be both on a global basis and/or broken down by transaction type.

The control data generating system 507 may be of the same type as the control data generating system 103 that is shown in FIG. 1 and discussed above, except that it may be configured to generate the receiving control data 509 based upon the financial transaction data that is received by the intermediate job processing system 503 and the sending control data 510 based upon the financial transaction data 505 that is generated by the intermediate job processing systems 503.

The data delivery system 511 may be configured to deliver the financial transaction data 505 to one or more other receiving job processing systems, such as to a final job processing system. The data delivery system 511 may be any of the types discussed above in connection with the data delivery system 109.

Similarly, the data delivery system 513 may be configured to deliver the receiving control data 509 and the sending control data 510 to a storage system. The data delivery system 513 may similarly be any of the types discussed above in connection with the data delivery system 111.

The intermediate job processing system 503 thus functions both as a receiving job processing system that receives financial transaction data from one or more other jobs and as a sending job processing system that generates and sends financial transaction data to one or more other receiving job processing systems. The intermediate job processing system 503 may be configured to supplement or modify the financial transaction data that it receives.

Figure 6:
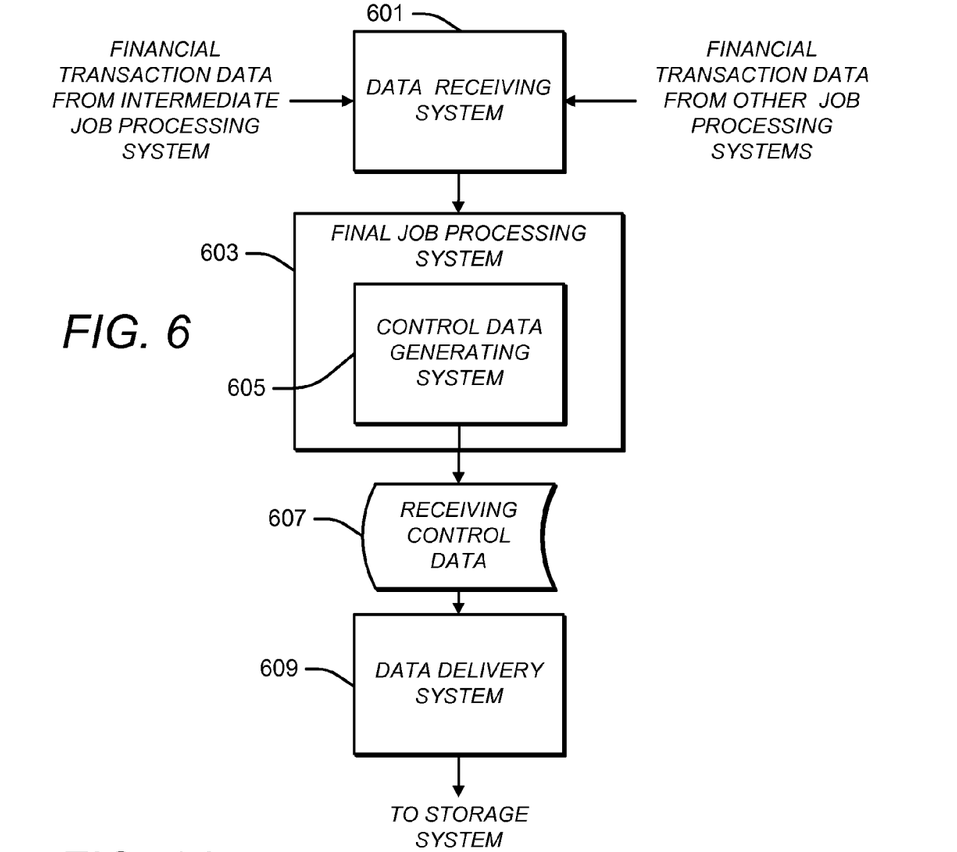
FIG. 6 illustrates receiving control data that may be generated by a final job processing system.

FIG. 6 illustrates receiving control data 607 that may be generated by a final job processing system 603. As shown in FIG. 6 a data receiving system 601 may be configured to receive financial transaction data from a one or more job processing systems, such as the intermediate job processing systems 503 shown in FIG. 5. The data receiving system 601 may be configured to combine the financial transaction data that it receives and to deliver it to the final job processing system 603.

The final job processing systems 603 may include a control data generating system 605 that is configured to generate the receiving control data 607 which, in turn, may be delivered to a storage system by a data delivery system 609.

Each of the components in FIG. 6 may be of any of the types discussed above in connection with the same or similarly named component in FIG. 1, 3 or 5 and may perform any or all of the same functions. One exception, however, may be that the final job processing system 603 may not be configured to generate any further financial transaction data that is destined for a further job processing system. Examples of such final job processing systems may include the accounts receivable, accounts payable and general ledger systems shown in FIG. 2.

The various job processing systems that have been discussed, as well as other job processing systems that may be used, may generate financial transaction data in substantially different formats. Notwithstanding, the control date generating systems that may be associated with each of these job processing systems may be configured to generate control data all in the same format, such as in the format of records with the fields of information shown in FIG. 4.

The data delivery systems that are configured to deliver control data to a storage system may be configured to a deliver that control data immediately upon receipt, in accordance with a schedule, in response to operator commands, and/or in response to a request from a centralized or other system or systems for the delivery of such control data.

Figure 7:
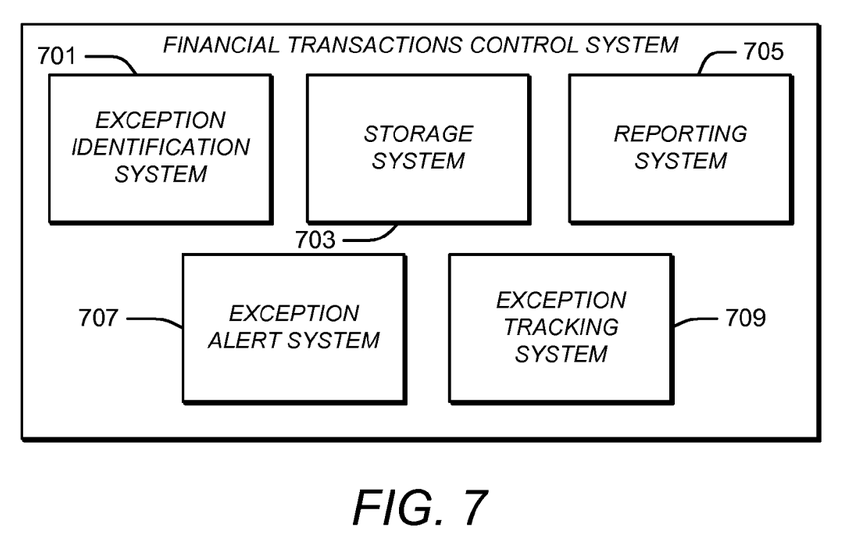
FIG. 7 illustrates components that may be in a financial transaction control system.

FIG. 7 illustrates components that may be in a financial transactions control system. The financial transactions control system may include an exception identification system 701, a storage system 703, a reporting system 705, an exception alert system 707, and/or an exception tracking system 709. Each of these components may be configured to perform one or more of the functions that are described below, as well as other functions. Other embodiments may not have all of these components and/or may have additional components.

Each of the components in FIG. 7 may be implemented by computer hardware and/or software. The hardware may include one or more of personal or other types of computers, either at a single location or distributed across multiple locations. Any type of communication system may be used to communicate between computers including a LAN, a WAN, a telephone line, the Internet and/or any combination of these communications systems. The communication may be over wires, may be wireless or may utilize a combination of these technologies. The software may include one or more operating systems and application programs. The software may be configured to operate on a stand-alone basis, in a client-server configuration, or any other configuration. Appropriate user-interface devices may be utilized to facilitate communication between one or more users and the financial transactions control system, including a one or more keyboards, mice, touch screens, microphones, displays, printers and/or sound systems.

Figure 8:
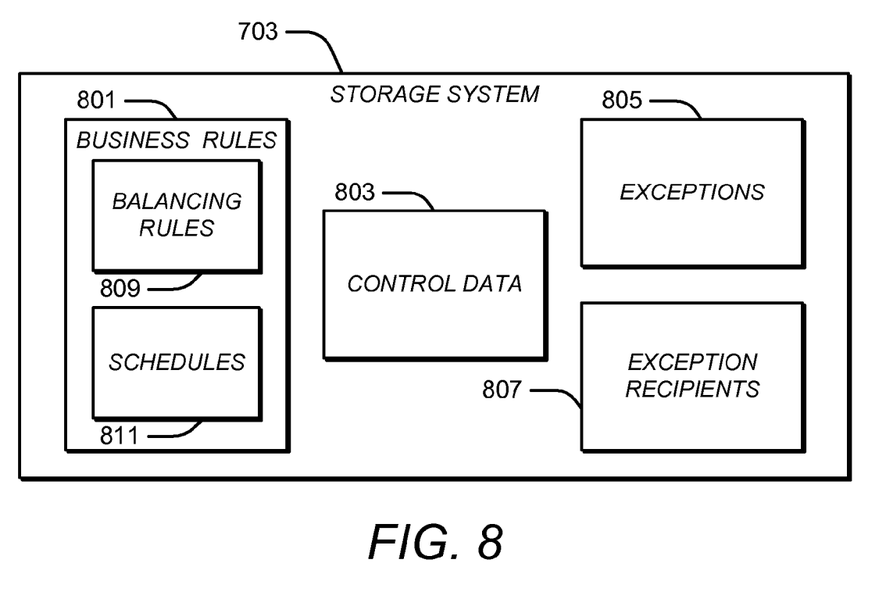
FIG. 8 illustrates databases that may be stored in the storage system illustrated in FIG. 7.

The storage system 703 may be configured to receive, consolidate and store various types of information relating to the financial transaction data. FIG. 8 illustrates databases that may be stored within the storage system illustrated in FIG. 7. As shown in FIG. 8, the storage system 703 may be configured to store a business rules database 801, a control data database 803, an exceptions database 805, and/or an exception recipients database 807. The business rules database 801 may include a balancing rules database 809 and/or a schedules database 811. Details about specific types of data that each of these databases may be configured to store are set forth below.

The storage system may include one or more storage devices, such as one or more hard disks, tapes, RAM, ROM, flash memory or any combination of these. The storage system 703, as well as each of its database, may be at a single location or distributed across multiple locations.

The storage system 703 may be configured with the aid of appropriate hardware and software to poll the various data delivery systems, such as the data delivery systems 111, 513 and/or 609, for the control data which has been provided to them for delivery. The polling may take place on a periodic basis, such as once a day, once a week or once a month. The polling may in addition or instead take place in accordance with a request by a user and/or another system. All of the control data may be requested at substantially the same time or in time-separated groups. For example, sending control data might be polled first, followed a few hours later by receiving control data. The control data that is received by the storage system 703 may be consolidated into a unified database, such as into the control data database 803.

The storage system 703 may be configured to receive business rules in the business rules database 801, including balancing rules in the balancing rules database 809 and schedules in the schedules database 811. These may be received from a user and/or another system. Examples of these various business rules are discussed below.

The exception identification system 701 may be configured to identify errors, commonly referred to as exceptions, in the financial transaction data. It may be configured to do so, for example, by accessing and applying the business rules, including the balancing rules and schedules, to the control data that is stored in the control data database 803.

The balancing rules, in turn, may be configured to identify errors in one or more of the totals in the sending control data and the receiving control data. The balancing rules may be configured to accomplish this by comparing totals in sending control data that is representative of financial transaction data that was sent to a particular job processing system with receiving control data generated by that particular job processing system. This comparison may identify run-to-run errors, such as errors that occurred during the delivery of the financial transaction data to the particular job processing system.

The balancing rules may in addition or instead be configured to compare receiving control data that is generated by a particular job processing system with sending control data that is generated by that same job processing system. This comparison may identify intra-job errors, such as errors that occurred during the job that was performed by the particular job processing system.

To facilitate comparisons, each balancing rule may define an equation. Each side of the equation may identify specific sending and/or receiving control data that is associated with a particular job. The totals in this identified control data may then be compared.

In some cases, the totals in one record of identified control data will be specified in balancing rules as being equal to the totals in another record of identified control data. For example, a balancing rule may specify that sending control totals generated by a sending job should equal receiving controls generated by a job that received financial transaction data from that sending job. Such a simple balancing rule may be used to verify that financial transaction data sent by a sending job is received without error.

In other cases, one side of the equation may be specified as a sum or difference of two or more totals of sending and/or receiving control data. This may occur, for example, when balancing jobs that receive financial transaction data from multiple sources and/or jobs that alter a total during their processing.

If the totals of the specified sending and/or receiving control data match the requirements of a balancing rule, the financial transaction data represented by this control data may be deemed error free. Otherwise, an exception may be indicated. Specific examples of balanced control data are now described.

Figure 9:
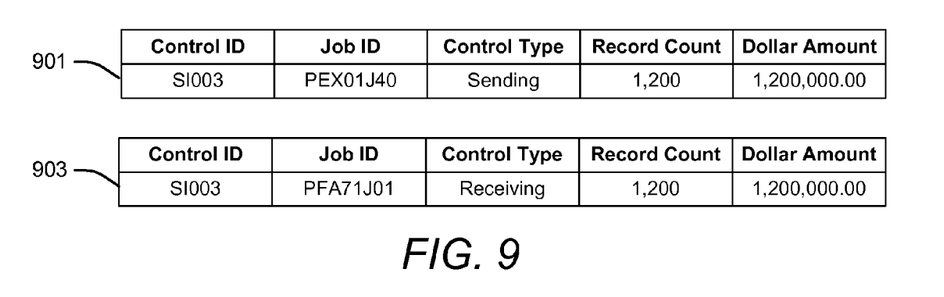
FIG. 9 illustrates sending control data generated by a first job being matched to receiving control data generated by a second job to which the first job sent financial transaction data.

FIG. 9 illustrates sending control data 901 generated by a first job being matched to receiving control data 903 generated by a second job to which the first job sent the financial transaction data from which the sending control data 901 was generated. The balancing rules that are stored in the balancing rules database 809 may include a balancing rule that specifically identifies these control data records and requires their totals to be equal. In the example illustrated in FIG. 9, the totals satisfy this rule. Both the record counts and the dollar amounts are the same.

Figure 10:
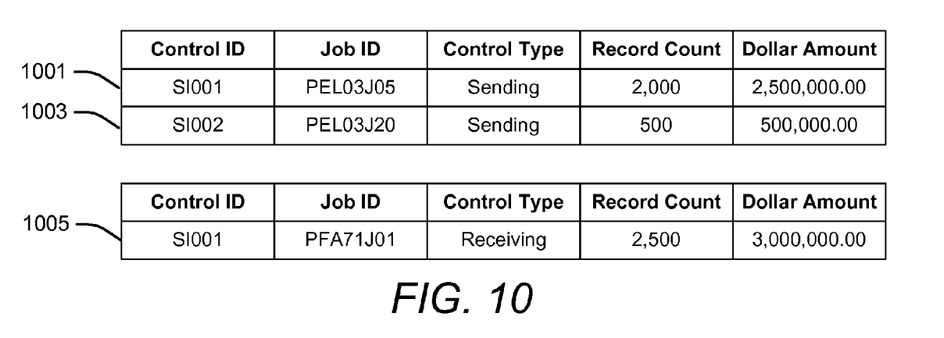
FIG. 10 illustrates sending control data generated by a first and a second job being matched to receiving control data generated by a third job to which the first and second job sent financial transaction data.

FIG. 10 illustrates sending control data 1001 generated by a first job and sending control data 1003 generated by a second job being matched to receiving control data 1005 generated by a third job to which the first and second job sent the financial transaction data on which the sending control data, respectively, was based. The balancing rule that points to this control data may be similar to the balancing rule that points to the control data shown in FIG. 9. One difference, however, may be that the second job that generated the receiving control data 1005 may receive and total sending control data from two different jobs. Thus, the "[multiple] runs-to-[single] run" balancing rule that is applicable to this data may specify that the totals of the receiving control data 1005 are to be compared to the sum of the totals of the sending control data 1001 and the sending control data 1003.

Figure 11:
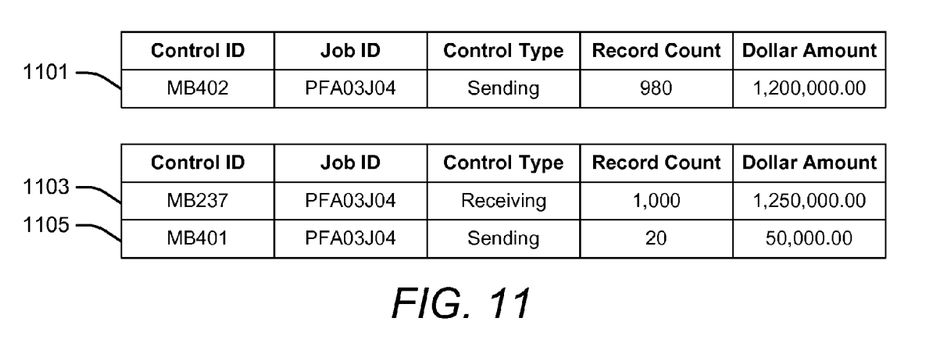
FIG. 11 illustrates sending control data generated by a job being matched to receiving control data and other sending control data generated by that job.

FIG. 11 illustrates sending control data 1101 generated by a job being matched to receiving control data 1103 and sending control data 1105 that were also generated by that job. In this example, all of the control data that is being analyzed may have been generated by the same job. Further, it may have generated two records of sending control data after having received financial transaction data from only a single job. Such a sequence may occur, for example, when the job removed certain transactions from the financial transaction data that it was processing. In this situation, the control data generating system that may have been associated with the job may have been configured to generate multiple records of sending control data, one to represent the financial transaction data that remains to be processed, and the other to represent the financial transaction data that has been removed from the process. Thus, the balancing rule that is applicable to this situation may specify that totals of the sending control data 1101 are to be compared to the difference between the receiving control data 1103 and the sending control data 1105. The sending control data that is generated by this job may include an additional field of information (not shown) that distinguishes the sending control record that represents the continuing portion of the financial transaction data from the sending control record that represents the removed portion of the financial transaction data.

The balancing rules may be in a different format and/or specify different types of comparisons.

The schedules that are stored in the schedules database 811 may be of any type and concerning any matter. They may include, for example, schedules as to when financial transaction data should be generated and/or received by each job, schedules when each sending and/or receiving job should be performed, and/or schedules as to when available control data should be polled, gathered, stored and/or analyzed for exceptions. Each schedule may specify a periodic basis for the action, such as once each day, week, month or quarter and/or specific dates and even times for each action. Each periodic schedule may specify a specific day and/or time during the period when the scheduled action should take place or that the action should take place by the end of the specified period. One or more of the schedules may be entered manually by a user, dictated by another system, and/or extracted from patterns in the financial transactions data and/or the control data.

Figure 12:
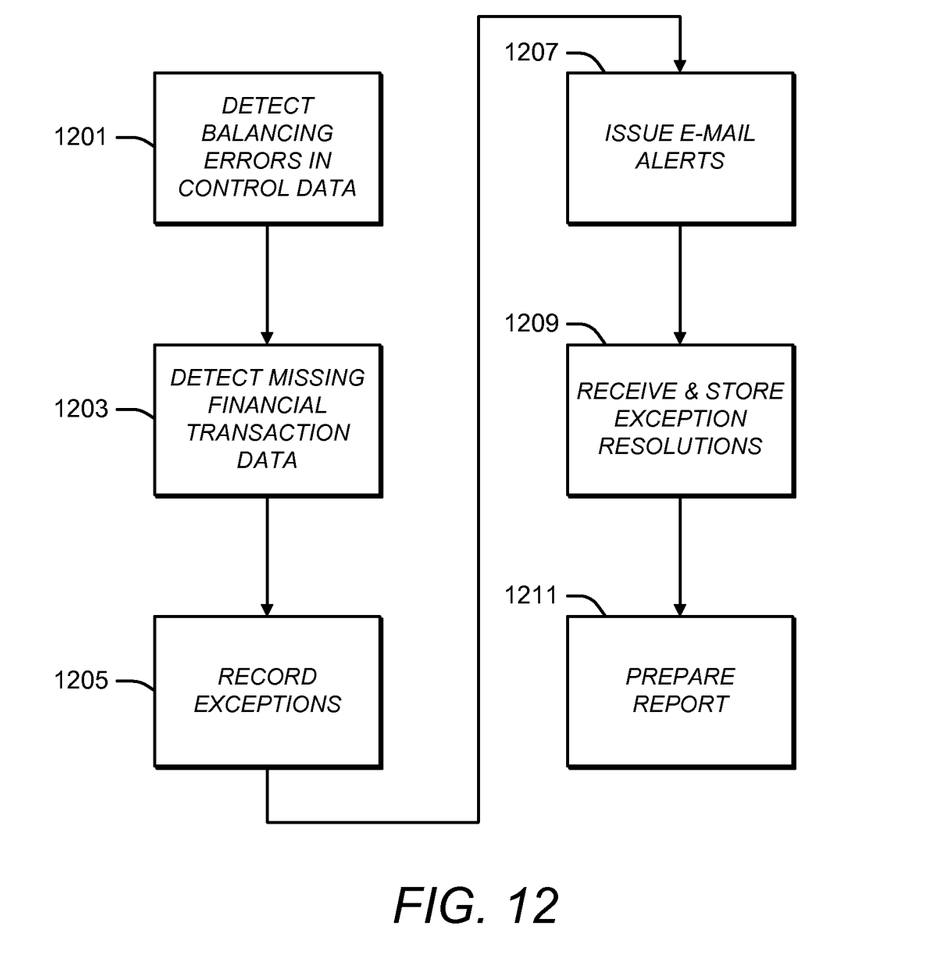
FIG. 12 illustrates a process that may be used for controlling financial transactions.

FIG. 12 illustrates a process that may be used for controlling financial transactions. This process may be implemented with the components illustrated in FIGS. 7 and 8 or with other components. Similarly, the components illustrated in FIGS. 7 and 8 may implement other processes.

As reflected in FIG. 12, mismatched totals in the control data may be detected, as reflected by a Detective Balancing Errors In Control Data step 1201; missing financial transaction data may be detected, as reflected by a Detect Missing Financial Transaction Data step 1203; exceptions noted during the detection of balancing errors and missing data may be recorded, as reflected by a Record Exceptions step 1205; alerts of exceptions may be emailed to appropriate persons, as reflected by an Issue E-Mail Alerts step 1207; information about the resolution of exceptions may be received and stored, as reflected by a Receive & Store Exception Resolutions step 1209; and reports relating to exceptions and their resolution may be prepared, as reflected by a Prepare Report step 1211. These steps may be executed in any order and at any time. Examples relating to each step are now described.

Figure 13:
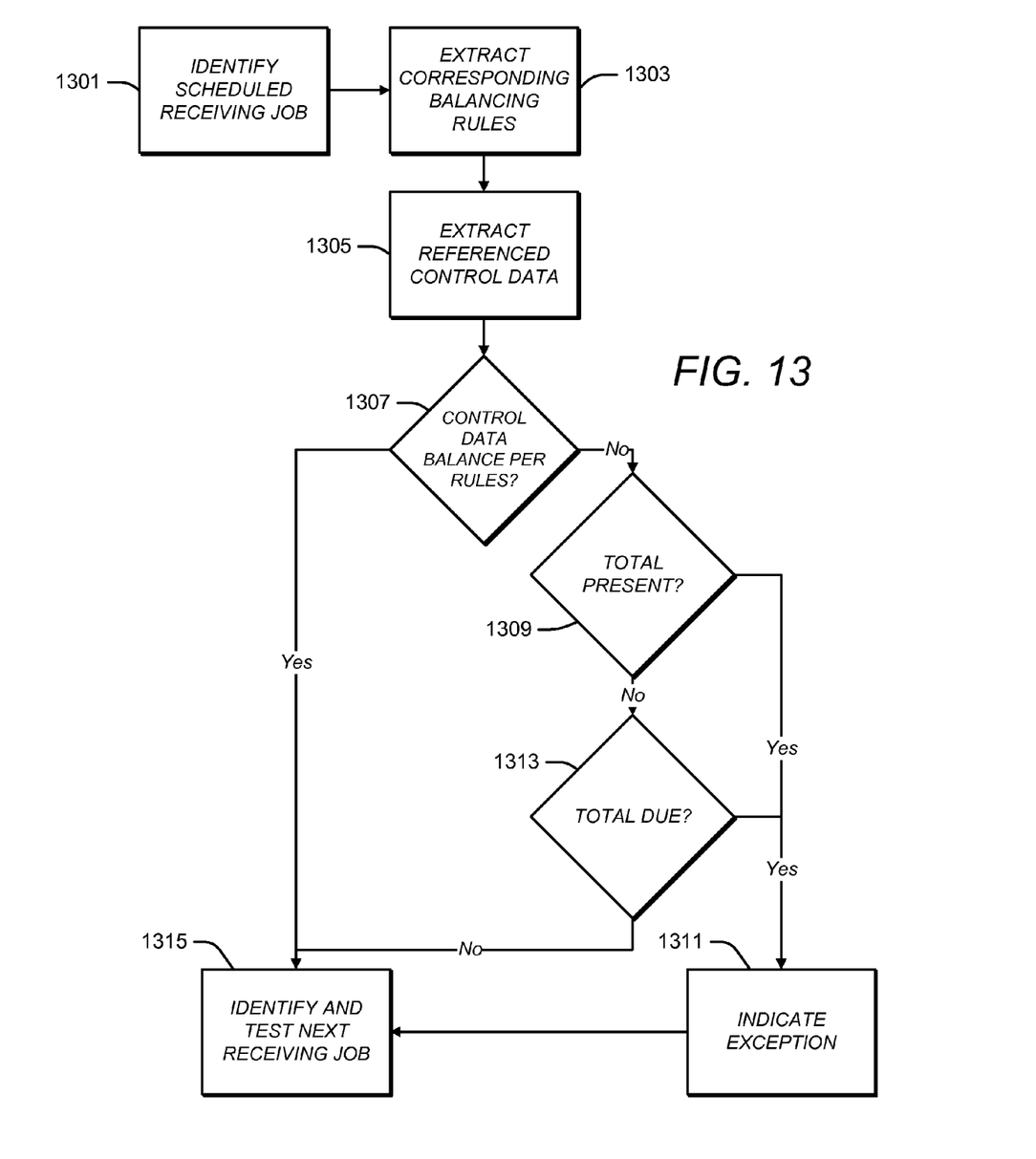
FIG. 13 illustrates a process that may be used for the Detect Balancing Errors in Control Data step and the Detect Missing Financial Transaction Data step illustrated in FIG. 12.

FIG. 13 illustrates a process that may be used for the Detect Balancing Errors in Control Data step 1201 and the Detect Missing Financial Transaction Data step 1203 illustrated in FIG. 12. The exception identification system 701 may be configured to perform one or both of these steps simultaneously, sequentially, at separate times, in any order, at any time, in response to a request by a user or another system and/or in accordance with a schedule that may be stored in the schedules database 811.

A receiving job that was scheduled to be completed between the last balancing and this balancing may be identified, as reflected by an Identify Scheduled Receiving Job step 1301. This may be accomplished by consulting the schedules database 811 for schedules specifying when each receiving job should be performed. This scheduling information may in addition or instead be provided by a user and/or received from another system.

The balancing rules within the balancing rules database 809 that are applicable to this scheduled receiving job may be extracted, as reflected by an Extract Corresponding Balancing Rules step 1303.

The control data that is referenced by the extracted balancing rules may be extracted from the control data database 803, as reflected by an Extract Referenced Control Data step 1305.

A determination may be made as to whether the extracted control data balances in accordance with the balancing rules for that particular job, as reflected by a Control Data Balance Per Rules? decision step 1307. This step may be implemented by determining whether the totals in the control data relating to the particular job satisfy the equations specified by the balancing rules. Examples of totals that do are illustrated in FIGS. 9-11 and discussed above.

If an error in a control data total is detected, a determination may be made as to whether the error is because a total is missing or because a total is present but in an amount other than what is required by a balancing equation, as reflected by a Total Present? decisions step 1309. If the total is present but inaccurate, this may be interpreted as indicating the presence of a balancing error, as reflected by an Indicate Exception step 1311. The Exception Tracking System 709 may be configured to cause any such indicated exception to be recorded in the exceptions database 805.

On the other hand, if the total is missing, a determination may be made as to whether the total is due, as reflected by a Total Due? decision step 1313. In some cases, the financial transaction data on which the missing total would have been based may not yet be due. In these cases, the absence of the total may not be indicative of an error.

Any approach may be used for determining whether the financial transaction data on which the missing total would have been based is due. In one embodiment, the schedule for the financial transaction data in the schedules database 811 may be consulted. If the financial transaction data was scheduled to be due, the absence of a corresponding total in its control data may be interpreted as being indicative of an exception. Conversely, if the financial transaction data was not scheduled to be due, the absence of a corresponding total its control data may not be interpreted as being indicative of an exception.

After an exception is indicated during the Indicate Exception step 1311, or if the control data is determined not to be due during the Total Due? decision step 1313, the process illustrated in FIG. 13 may be repeated for the next receiving job that is scheduled to be due, as reflected by an Identify and Test Next Receiving Job step 1315. The process shown in FIG. 13 may continue to repeat until the control data associated with all scheduled receiving jobs has been analyzed for exceptions.

The exception alert system 707 may be configured to provide alerts to appropriate personnel about exceptions, such as to automatically perform the Issue E-Mail Alerts step 1207, in response to the detection of each exception. In one embodiment, the exception alert system 707 may be configured to consult the exception recipients database 807 as part of this process.

Figure 14:
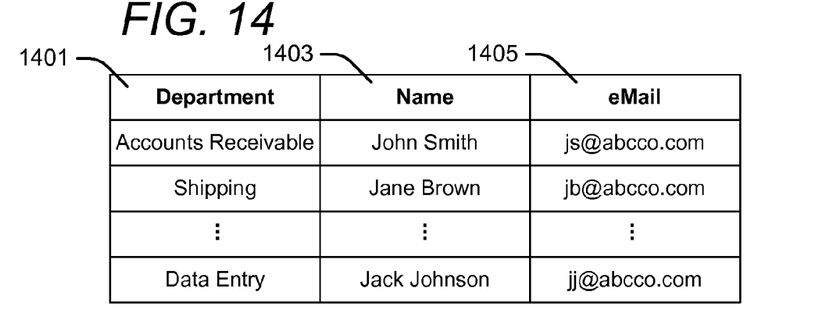
FIG. 14 illustrates data that may be in the exception recipients database illustrated in FIG. 8.

FIG. 14 illustrates data that may be in the exception recipients database 807. As illustrated in FIG. 14, the exception recipients database 807 may include information identifying a department 1401 whose exceptions a recipient has been designated to handle, a name 1403 of the recipient that has been designated to handle exceptions relating to that department, and his or her e-mail address 1405. In some embodiments, the nature of each exception may be classified in ways other than or in addition to departments or even business units. For example, exceptions may be classified by their seriousness. Individuals assigned to these other classifications of exceptions may similarly be indicated in the exception recipients database 807 in addition or instead.

The exception identification system 701 may be configured during the Record Exceptions step 1205 to include information identifying the nature of each exception, such as the department to which it relates. The exception alert system 707 may be configured to utilize this information when it looks up the recipient or recipients that have been assigned to handle exceptions of this nature in the exception recipients database 807.

Upon identifying one or more appropriate recipients, the exception alert system 707 may be configured to automatically send an e-mail to each of the identified recipients alerting him or her to the exception that has been detected. The email may include one or more fields of information in the control data that failed to satisfy a balancing rule, details about the rule, as well as other information. Forms of communication other than e-mail may be used in addition or instead.

One or more recipients of an e-mail alert, or one or more other persons, may take steps to resolve the exception that is the subject of the alert. The steps may include correcting the error that caused the exception or determining that the exception is not truly indicative of an error. Information about such efforts and their results may be communicated, received and stored in the exceptions database 805, as reflected by the Receive & Store Exception Resolutions step 1209. This may be performed in an automated manner through the receipt and automated processing of communications from the individuals that have resolved the exception by the exceptions tracking system 709, or through a manual process, such as by an administrator to whom information about exception resolution efforts has been provided.

Reports relating to the exceptions may be prepared, as reflected by the Prepare Report step 1211. These reports may be prepared by the reporting system 705. The reporting system 705 may access information in the exceptions database 805. These reports may be prepared at any time, in accordance with a schedule, before or after the occurrence of any step of the error detection or resolution process and/or upon the request of a user or another system. For example, a set of reports may be prepared each time following the completion of steps 1201-1205.

Any type of report or reports may be prepared. Some reports, for example, may specify only newly-discovered exceptions. For example, one report may specify run-to-run exceptions, another may specify intra-job exceptions, and a still further report may specify missing financial information data.

Historic reports may also be prepared. One report, for example, may itemize exceptions that have been resolved. Another report may itemize exceptions that have not been resolved. Information in the historic reports may be grouped by the age of the exception, such as 0-10 days, 11-30 days, 31-60 days and 90+ days.

The reports may include any type of information. For example, a report may include the business rule that was violated, the control data that violated the business rule, the department to which the exception relates, the recipient that was alerted to the exception and/or the status of its resolution.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

For example, the business rules may be in a different form. A single business rule, for example, may include both balancing and scheduling information. Such a rule may include a logical combination of one or more conditions. The business rules may also be applied for the purpose of detecting exceptions, including erroneous and/or missing information, in any type of financial transaction data, not merely control data of the type that has been described.

Similarly, the exception alert system may be used in conjunction with any exception that has been observed in financial transaction data, not merely in connection with erroneous or missing totals in control data.

In short, the scope of protection is limited solely by the claims that now follow. That scope is intended to be as broad as is reasonably consistent with the language that is used in the claims and to encompass all structural and functional equivalents.

The phrase "means for" when used in a claim embraces the corresponding structure and materials that have been described and their equivalents. Similarly, the phrase "step for" when used in a claim embraces the corresponding acts that have been described and their equivalents. The absence of these phrases means that the claim is not limited to any corresponding structures, materials, or acts.

Nothing that has been stated or illustrated is intended to cause a dedication of any component, step, feature, object, benefit, advantage or equivalent to the public, regardless of whether it is recited in the claims.

The invention claimed is:

1. A financial transactions control machine for automating the correction of exceptions in financial transaction data comprising:
   an exception identification system configured to detect exceptions in the financial transaction data and to identify a business unit to which each exception relates;
   a storage system configured to store information about the detected exceptions, recipients designated to handle the detected exceptions, including the business unit or units that each recipient has been designated to handle; and the status of efforts to resolve the exceptions; and
   an exception alert system configured to automatically in response to each detected exception:
   look up the identity of at least one recipient that is indicated in the storage system as having been designated to handle exceptions relating to the identified business unit; and
   cause a message to be delivered to the at least one identified recipient alerting the at least one identified recipient to the exception;
   an exception tracking system configured to track each exception and the status of efforts to resolve it; and
   a reporting system configured to generate reports about the exceptions and the status of efforts to resolve them, wherein the reporting system is configured to sort at least one of the reports by the age of the exception with respect to when it was detected, wherein the reporting system is configured to provide at least one report that specifies errors that occurred during the delivery of the financial transaction data to the financial transactions control machine.

2. The financial transactions control machine of claim 1 wherein the exception alert system is configured to deliver each message by email.

3. The financial transactions control machine of claim 2 wherein the storage system is configured to store the email address of each recipient.

4. The financial transactions control machine of claim 1 wherein the exception tracking system is configured to receive and automatically store emails from each recipient to whom an alert was sent that include information about the status of efforts to resolve the exception for which a message was sent to the recipient by the exception alert system.

5. The financial transactions control machine of claim 1 wherein the reporting system is configured to provide one report that specifies errors that occurred during the delivery of the financial transaction data to the financial transactions control machine, another report that specifies errors that occurred during a job performed by the financial transactions control machine, and another report that specifies missing financial data.

6. The financial transactions control machine of claim 1 wherein the reporting system is configured to provide one report that specifies errors that occurred during a job performed by the financial transactions control machine.

7. The financial transactions control machine of claim 1 wherein the reporting system is configured to provide one report that specifies missing financial data.

8. A financial transactions control machine for automating the correction of exceptions in financial transaction data comprising:
   an exception identification system configured to detect exceptions in the financial transaction data;
   a storage system configured to store information about the detected exceptions, recipients designated to handle the detected exceptions, including the email address of each recipient, and the status of efforts to resolve the exceptions;
   an exception alert system configured to automatically in response to each detected exception:
   look up the identity of at least one recipient that has been designated in the storage system to handle the exception; and
   cause a message to be delivered by email to the at least one identified recipient alerting the at least one identified recipient to the exception;
   an exception tracking system configured to receive and automatically store emails from each recipient to whom an alert was sent that include information about the status of efforts to resolve the exception for which a message was sent to the recipient by the exception alert system; and
   a reporting system configured to generate reports about the exceptions and the status of efforts to resolve them, including a report that specifies errors that occurred during a job performed by the financial transactions control machine, wherein the reporting system is configured to provide at least one report that specifies errors that occurred during the delivery of the financial transaction data to the financial transactions control machine.

9. The financial transactions control machine of claim 8 wherein:
   the exception identification system is configured to identify the nature of each exception;
   the storage system is configured to store information about the nature of exceptions that each recipient has been designated to handle; and
   the exception alert system is configured to look up the identity of at least one recipient that is indicated in the storage system as having been designated to handle an exception of the nature identified.

10. The financial transactions control machine of claim 8 wherein the reporting system is configured to sort at least one of the reports by the age of the exception.

11. The financial transactions control machine of claim 8 wherein the reporting system is configured to provide one report that specifies errors that occurred during the delivery of the financial transaction data to the financial transactions control machine and another report that specifies missing financial data.

12. The financial transactions control machine of claim 8 wherein the exception alert system is configured to deliver each message by email.

13. The financial transactions control machine of claim 12 wherein the storage system is configured to store the email address of each recipient.

14. The financial transactions control machine of claim 8 wherein the reporting system is configured to provide one report that specifies missing financial data.

* * * * *